United States Patent
Takahashi et al.

(10) Patent No.: US 10,363,685 B2
(45) Date of Patent: Jul. 30, 2019

(54) INGOT CUTTING APPARATUS, AND LOAD DETECTING DEVICE USED IN INGOT CUTTING APPARATUS

(71) Applicants: Tec Gihan Co., Ltd., Uji, Kyoto (JP); Panasonic Corporation, Kadoma-shi, Osaka (JP)

(72) Inventors: Masayuki Takahashi, Kadoma (JP); Yoshihiko Yagi, Kadoma (JP); Kazumi Koketsu, Uji (JP); Yotaro Tsuchiya, Uji (JP)

(73) Assignees: TEC GIHAN CO., LTD., Kyoto (JP); PANASONIC CORPORATION, Osaka (JP)

( * ) Notice: Subject to any disclaimer, the term of this patent is extended or adjusted under 35 U.S.C. 154(b) by 39 days.

(21) Appl. No.: 15/716,048

(22) Filed: Sep. 26, 2017

(65) Prior Publication Data
US 2018/0085969 A1    Mar. 29, 2018

(30) Foreign Application Priority Data
Sep. 27, 2016 (JP) .................................. 2016-188931

(51) Int. Cl.
| | |
|---|---|
| B28D 1/08 | (2006.01) |
| B28D 5/04 | (2006.01) |
| B23D 59/00 | (2006.01) |
| B28D 5/00 | (2006.01) |
| B26D 1/553 | (2006.01) |
| B26D 11/00 | (2006.01) |
| B26D 1/00 | (2006.01) |

(52) U.S. Cl.
CPC ........... *B28D 5/045* (2013.01); *B23D 59/001* (2013.01); *B28D 5/0064* (2013.01); *B26D 1/553* (2013.01); *B26D 11/00* (2013.01); *B26D 2001/008* (2013.01); *B26D 2210/00* (2013.01)

(58) Field of Classification Search
CPC ........................................................ B28D 1/08
USPC .................... 451/296, 5, 8, 9, 10; 125/16.02
See application file for complete search history.

(56) References Cited

U.S. PATENT DOCUMENTS

| | | | | |
|---|---|---|---|---|
| 5,699,782 A | * | 12/1997 | Toyama | B23D 57/0053 125/16.01 |
| 6,178,961 B1 | * | 1/2001 | Nagatsuka | B23D 57/0053 125/16.02 |
| 8,881,716 B2 | * | 11/2014 | Hoshiyama | B23D 57/0069 125/16.02 |

FOREIGN PATENT DOCUMENTS

JP    2014-96561 A    5/2014

\* cited by examiner

*Primary Examiner* — Robert A Rose
(74) *Attorney, Agent, or Firm* — Westerman, Hattori, Daniels & Adrian, LLP (57) ABSTRACT

In an ingot cutting apparatus that cuts an ingot using a plurality of stretched wires, load sensors are provided on the new wire side and the old wire side of the ingot, and loads applied to the new wire side and the old wire side of the ingot are measured using the load sensors on the new wire side and the old wire side. When measuring the loads, for example, the center of moment about the X-axis that is the running direction of the wire is calculated. When the deviation from the center of gravity of the ingot is greater than or equal to a reference value, notification for replacement of the wire, control of the conveying speed of the wire, control of the pressing speed of the ingot, and so forth are performed through a control unit.

16 Claims, 11 Drawing Sheets

INGOT CUTTING APPARATUS, AND LOAD DETECTING DEVICE USED IN INGOT CUTTING APPARATUS

BACKGROUND OF THE INVENTION

1. Field of the Invention

The present invention relates to an ingot cutting apparatus that cuts, for example, a silicon ingot into slices, and more specifically, it relates to an ingot cutting apparatus that cuts an ingot using a wire saw.

2. Description of the Related Art

Hitherto, an ingot cutting apparatus using a wire saw has been known as a cutting apparatus that cuts silicon wafers out of a silicon ingot (Japanese Unexamined Patent Application Publication No. 2014-96561). This ingot cutting apparatus using a wire saw will be described with reference to FIG. 11.

Figure 11:
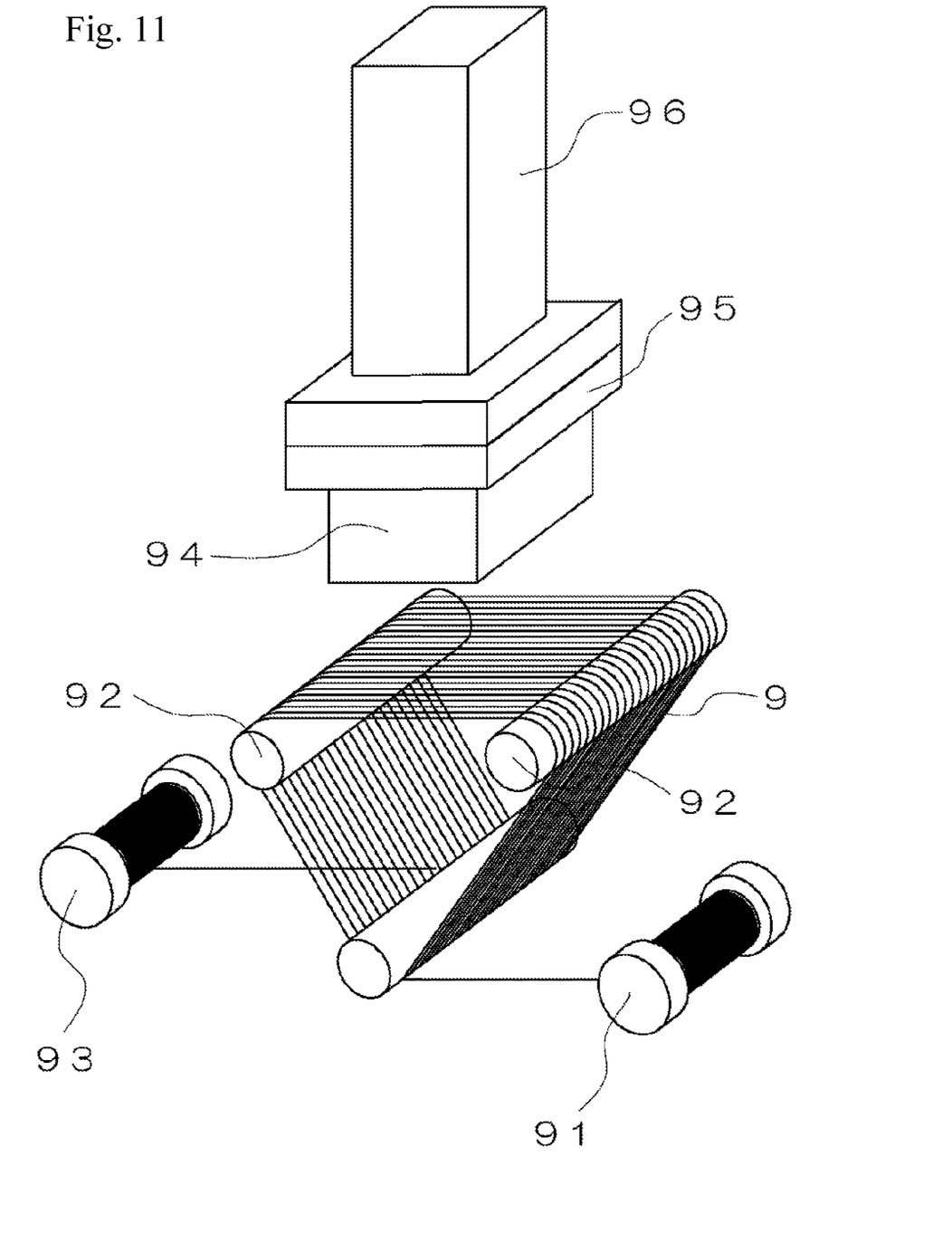
FIG. 11 shows an ingot cutting apparatus in a conventional example.

In FIG. 11, reference sign 9 denotes a steel wire, to the surface of which diamond grain for cutting is adhered. The steel wire 9 is paid out from a pay-out bobbin 91, is wound around a plurality of main rollers 92 including a pair of left and right main rollers 92 at a predetermined pitch (250 μm), and is then recovered to a recovering bobbin 23. The reference sign 94 denotes a silicon ingot, which is attached to a slicing table 95 with an adhesive and is moved in the vertical direction by an elevating device 96.

When cutting thin silicon wafers out of the silicon ingot 94 using such an apparatus, new wire 9 is paid out from the pay-out bobbin 91, is wound around the pair of left and right main rollers 92, and is caused to run. In a state where the wire 9 is caused to run at a constant speed, the ingot 94 is pressed against the surfaces of the plurality of wires 9, and the ingot 94 is cut at a predetermined pitch. At this time, for example, about 800 meters of wire 9 is paid out, the wire 9 is stopped, and then the wire 9 is caused to run in the backward direction. When causing the wire 9 to run in the backward direction, the ingot 94 is cut while returning about 780 meters of wire 9, the main rollers 92 are stopped again, and the wire 9 is caused to run in the forward direction. In the same manner, the wire 9 is caused to run in the forward direction and the backward direction, and the ingot 94 is cut. A length corresponding to the difference in running distance between the outward running and the backward running (about 20 meters) of new wire 9 is paid out from the pay-out bobbin 91, and the ingot 94 is cut.

When cutting an ingot using a wire saw, there is the following problem.

Figure 5:
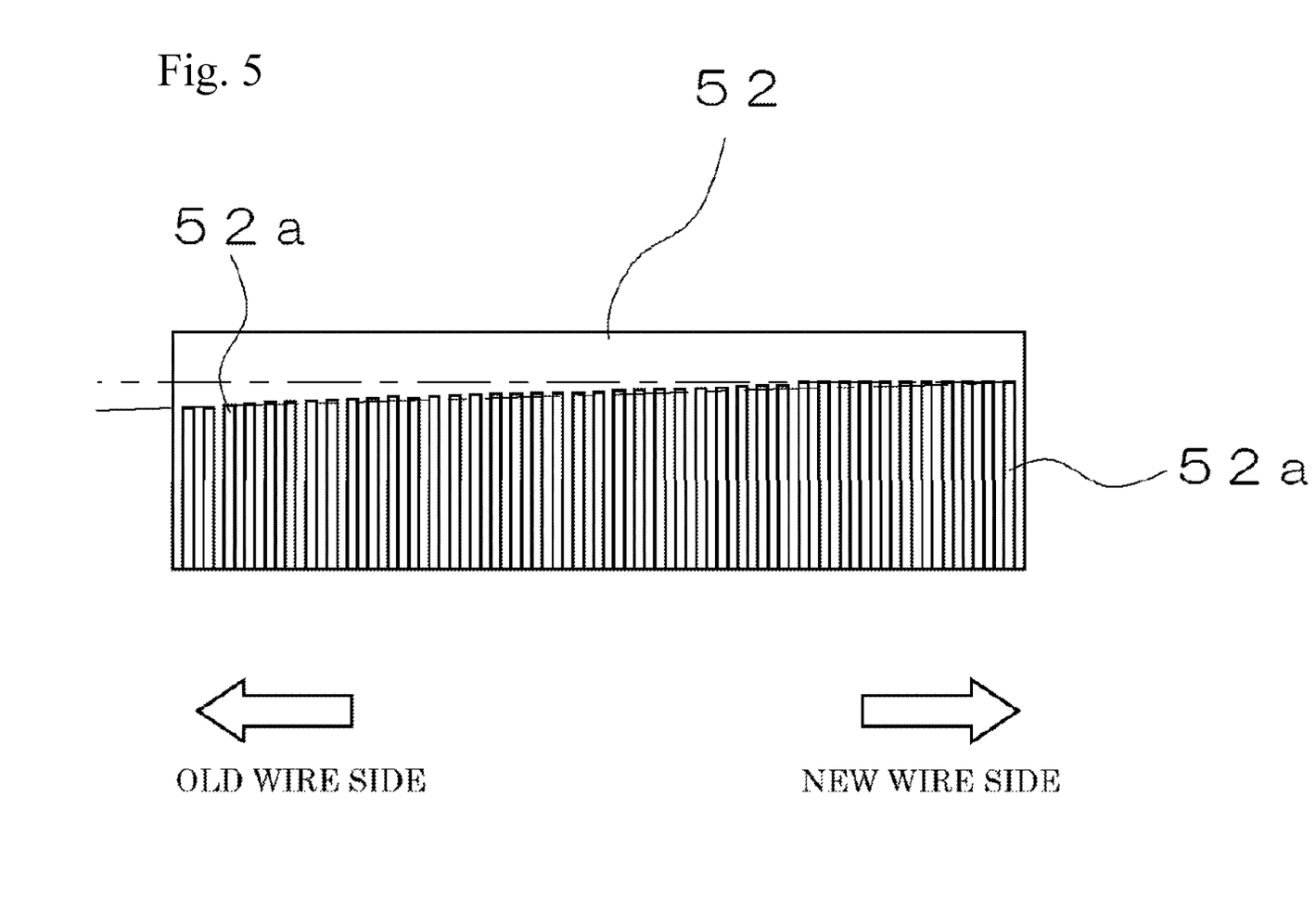
FIG. 5 shows the state of cutting grooves in an ingot.

When cutting an ingot using a steel wire, in general, the longer the distance for which the wire is in contact with the ingot, the more diamond grain for cutting is removed from the surface thereof, and cutting ability decreases. For this reason, when cutting an ingot using such a wire, as shown in FIG. 5, on a side of the ingot where new wire is supplied (hereinafter referred to as "new wire side"), since many diamond grains for cutting adhere to the surface of the wire, the cutting grooves are deep. On the other hand, on a side of the ingot where wire is recovered (hereinafter referred to as "old wire side"), since diamond grains for cutting are removed, the cutting grooves are shallow. When the ingot is pressed against the wire in a state where the cutting grooves on the old wire side are shallow, on the old wire side, the wire is significantly bent, and is broken.

SUMMARY OF THE INVENTION

It is an object of the present invention to provide an ingot cutting apparatus that cuts an ingot using a wire in which the cutting states of the new wire side and the old wire side of the ingot are grasped so that the breakage of the wire can be prevented.

In an aspect of the present invention, an ingot cutting apparatus that cuts an ingot by pressing the ingot against a wire wound a plurality of turns around a pair of rollers, includes a measuring device that measures loads applied to the ingot or the amount of bending of the wire on a new wire side where new wire is supplied to the ingot and an old wire side where old wire is recovered.

It is preferable that the measuring device include load sensors attached to a slicing table holding the ingot, and be a device that measures loads along a pressing direction of the ingot on the new wire side and the old wire side of the ingot.

It is preferable that the measuring device include load sensors attached to a slicing table holding the ingot, and be a device that measures loads along a running direction of the wire on the new wire side and the old wire side of the ingot.

It is preferable that the measuring device include load sensors attached to a slicing table holding the ingot, and measure the moment of the ingot about an axis along the pressing direction.

It is preferable that the measuring device include load sensors attached to a slicing table holding the ingot, and measure the moment of the ingot about an axis along the running direction of the wire.

It is preferable that the measuring device include load sensors attached to a slicing table holding the ingot, and measure the distance between the center of moment of the ingot about an axis in the pressing direction and the center of gravity of the ingot.

It is preferable that the measuring device include load sensors attached to a slicing table holding the ingot, and measure the distance between the center of moment of the ingot about an axis along the running direction of the wire and the center of gravity of the ingot.

It is preferable that the measuring device be composed of an inductive proximity sensor that measures the amount of bending of the wire.

According to the present invention, since loads applied to the new wire side and the old wire side of the ingot and the amount of bending of the wire are measured, the difference in cutting state between the new wire side and the old wire side can be grasped, and the difference in tension applied to the wire can be eliminated so that the breakage of the wire can be prevented.

DESCRIPTION OF THE PREFERRED EMBODIMENTS

An embodiment of the present invention will now be described with reference to the drawings.

Figure 1:
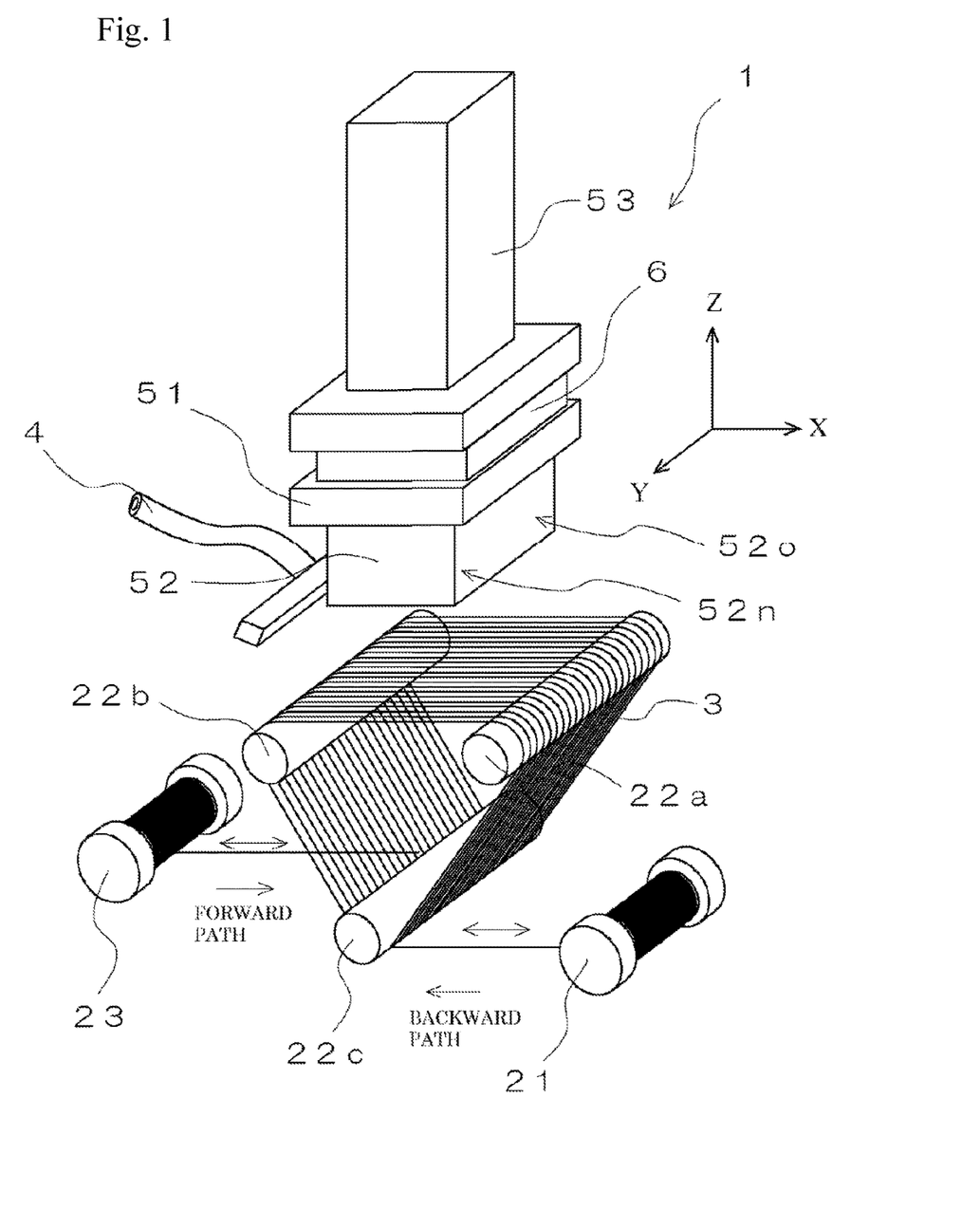
FIG. 1 is an entire schematic view of an ingot cutting apparatus in an embodiment of the present invention.

An ingot cutting apparatus 1 according to this embodiment can cut thin silicon wafers from an ingot 52 using a multi wire saw, and includes, as shown in FIG. 1, a pay-out bobbin 21 that pays out new wire 3, a plurality of main rollers 22a to 22c around which the wire 3 paid out from the pay-out bobbin 21 is wound at a predetermined pitch, and a recovering bobbin 23 that recovers the wire 3 from the main rollers 22a to 22c. The pay-out bobbin 21, the recovering bobbin 23, and the main rollers 22a to 22c are driven by motors (not shown). Between a pair of main rollers 22a and 22b around which the wire 3 are wound, an elevating device 53 for pressing the ingot 52 held by a slicing table 51 against a plurality of wires 3 is provided. The ingot 52 is pressed against the surface of the wire 3 by the elevating device 53 so that silicon wafers can be cut out. Characteristically, a load detecting device 6 is provided that has load sensors S (S11 to S22) shown in FIG. 2 above the slicing table 51 and on the new wire side 52n of the ingot 52 where new wire 3 is supplied and on the old wire side 52o of the ingot 52 where wire 3 after cutting is recovered so that the load when the ingot 52 is pressed against the wire 3 can be detected and the cutting state of the ingot 52 can be grasped. This embodiment will be described in detail below.

A new wire 3 is wound on the pay-out bobbin 21, and the wire 3 can be paid out from this. As the wire 3, a wire is used to the surface of which abrasive grains for cutting are adhered and that has a diameter of about 50 μm to 500 μm. Specifically, for example, a steel wire is used on which, for example, diamond fixed abrasive grains are electrodeposited. A wire 3 that is about 50 km to 100 km long is wound on the pay-out bobbin 21. When paying out the wire 3, the wire 3 can be paid out in the forward direction by rotating the motor forward. When causing the wire 3 to run in the backward direction, the wire 3 can be recovered to the pay-out bobbin 21 by reversing the motor. When paying out the wire 3 from the pay-out bobbin 21, a tension of 10 N is applied to the wire 3 by a tension roller (not shown) provided between the main rollers 22a to 22c.

The wire 3 paid out from the pay-out bobbin 21 is wound around the main rollers 22a to 22c helically at a predetermined pitch. A plurality of grooves for winding the wire 3 are formed parallel to each other in the surface of each of the main rollers 22a to 22c. The pitch of the grooves is set to, for example, 250 μm, and one wire 3 is wound a plurality of turns so that the ingot 52 can be pressed against a plurality of wires 3 and thin silicon wafers can be cut out. A cutting area can be formed by a plurality of wires 3 between the upper two of the main rollers 22, the pair of left and right main rollers 22a and 22b. The lower main roller 22c serves as a driving roller and causes the wire 3 to run in the forward direction and the backward direction.

A cooling unit 4 for discharging coolant liquid is provided in the vicinity of the pair of left and right main rollers 22a and 22b. This coolant liquid cools the ingot 52 heated by friction during the cutting by the wire 3. A large amount of coolant liquid is discharged to the entire part cut by the wire 3.

The recovering bobbin 23 recovers the wire 3 wound around the main rollers 22a to 22c. The recovering bobbin 23 recovers the wire 3 using a motor. By reversing the motor, the wire 3 is caused to run from the recovering bobbin 23 in the backward direction. A tension roller (not shown) for controlling the tension of the wire 3 is provided between the recovering bobbin 23 and the main rollers 22. Control is performed such that a tension of about 10 N is applied by this tension roller.

As the ingot 52 cut by the wire 3, an ingot of silicon is used here. Thin silicon wafers cut out of the ingot 52 are used for semiconductors, solar cells, LEDs, and power semiconductors. The ingot 52 has a rectangular parallelepiped shape in FIG. 1, but may have a cylindrical shape. The shape of the ingot 52 is not particularly limited.

The ingot 52 is attached to the slicing table 51 with an adhesive. The slicing table 51 is made, for example, of a carbon material containing a binder material. The part of the slicing table 51 that is bonded to the ingot 52 may be made of the same material as the ingot 52 so that the breakage of the wire 3 at the end of the cutting of the ingot 52 can be prevented.

Figure 2:
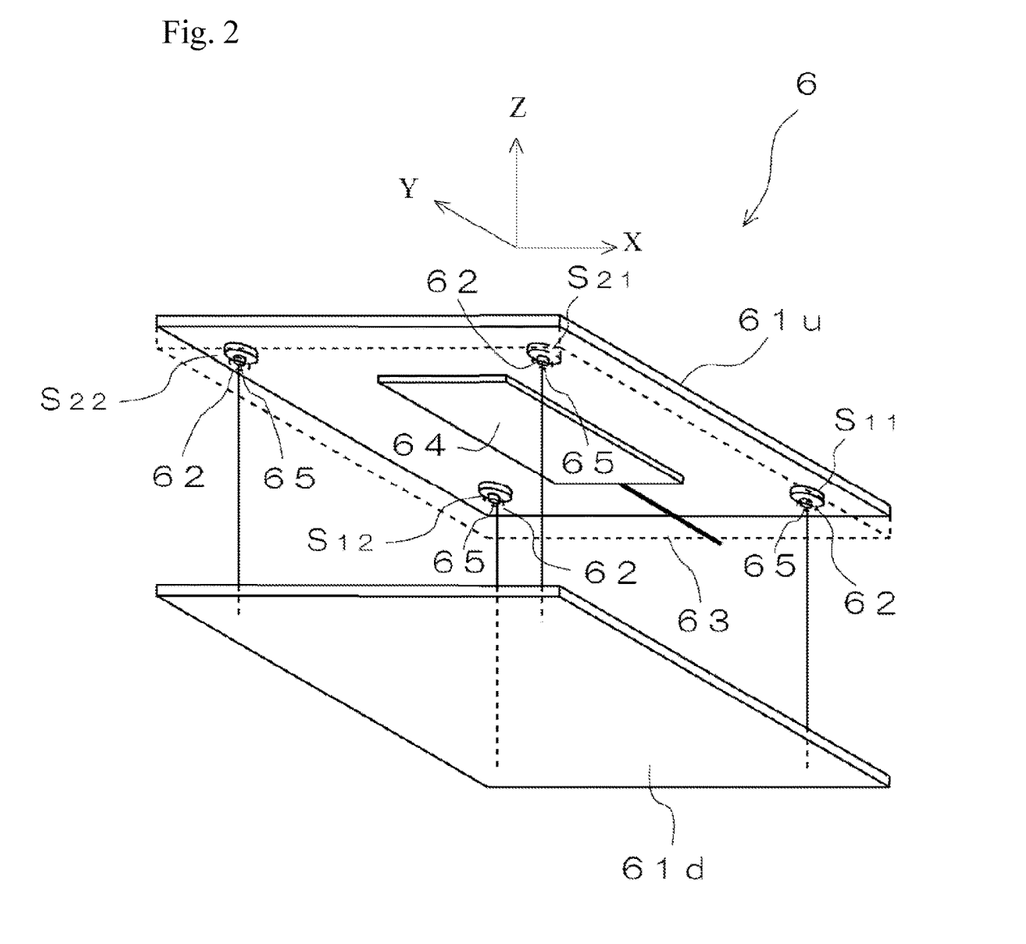
FIG. 2 is a schematic view of a load detecting device in the embodiment.

In such a configuration, in this embodiment, characteristically, a load detecting device 6 that makes up a measuring device is provided on the upper surface side of the slicing table 51. The load detecting device 6 is configured by attaching load sensors S (S11 to S22) to the vicinities of the four corners of a pair of upper and lower metal plates 61u and 61d as shown in FIG. 2. When the load detecting device 6 is used, the upper metal plate 61u is attached to the elevating device 53, and the lower metal plate 61d is attached to the slicing table 51. As the load sensors S used in this load detecting device 6, load sensors are used that can detect the loads in the directions of three axes: the X-axis along which the wire 3 runs, the Y-axis along which a plurality of wires 3 are adjacent to each other, and the Z-axis perpendicular to these axes. Although load sensors S in the three axis direction are used here, load sensors that detect only the load in the X-axis direction, or load sensors that detect only the load in the Z-axis direction may be used. Such load sensors S include, but are not limited to, load cells employing strain gauges.

When detecting the load using the load sensors S of the load detecting device 6, reaction force applied from the wire 3 when the ingot 52 is lowered is detected, and the detected values, and values of moment calculated from the detected values are output. When performing calculation from the load detected by the load sensors S, calculation is performed by a board 64 attached to the upper metal plate 61u, and the result is output to a computer. When such a load detecting device 6 is attached to the slicing table 51, coolant liquid discharged from the cooling unit 4 and cutting powder may enter between the metal plates 61u and 61d, and the coolant liquid and cutting powder may be detected as a load. So, as shown by dashed line in FIG. 2, the upper metal plate 61u and the load sensors S are sealed in a housing 63, and detecting pins 65 of the load sensors S are protruded through holes 62 of the housing 63 and are attached to the lower metal plate 61d.

Figure 3A:
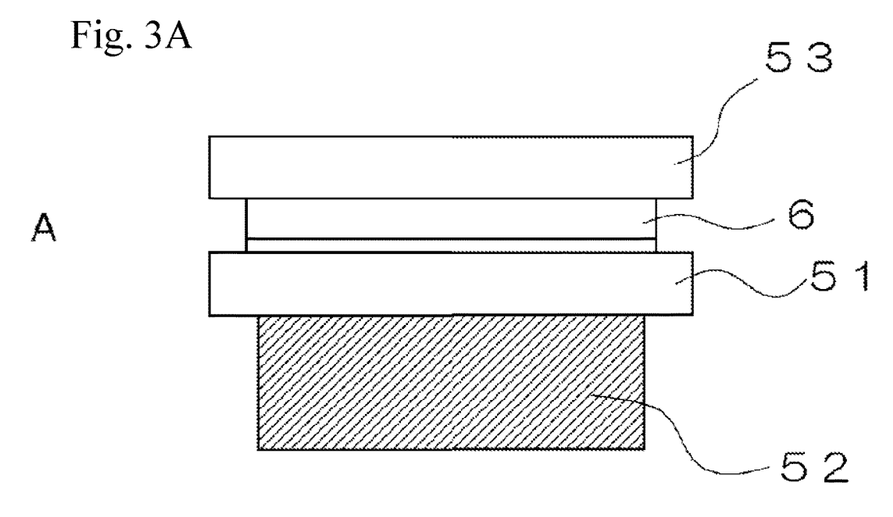
FIGS. 3A and 3B show states where different sizes of ingots are attached to a slicing table in the embodiment.
Figure 3B:
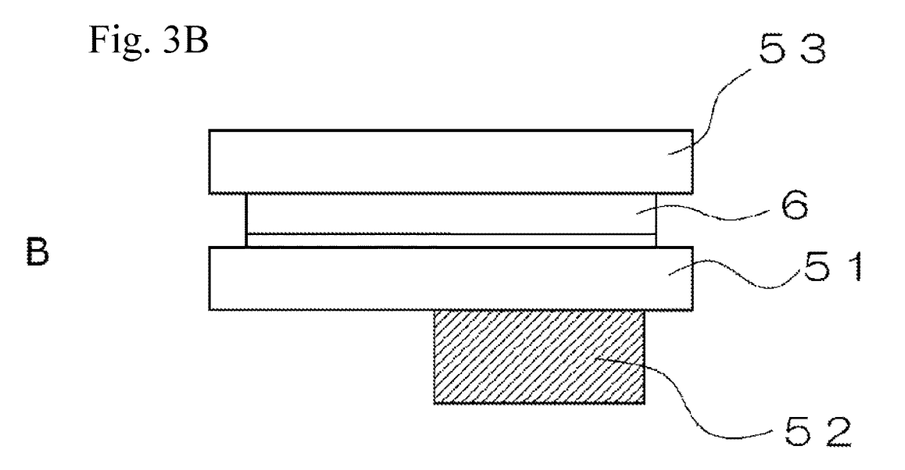
Figure 4:
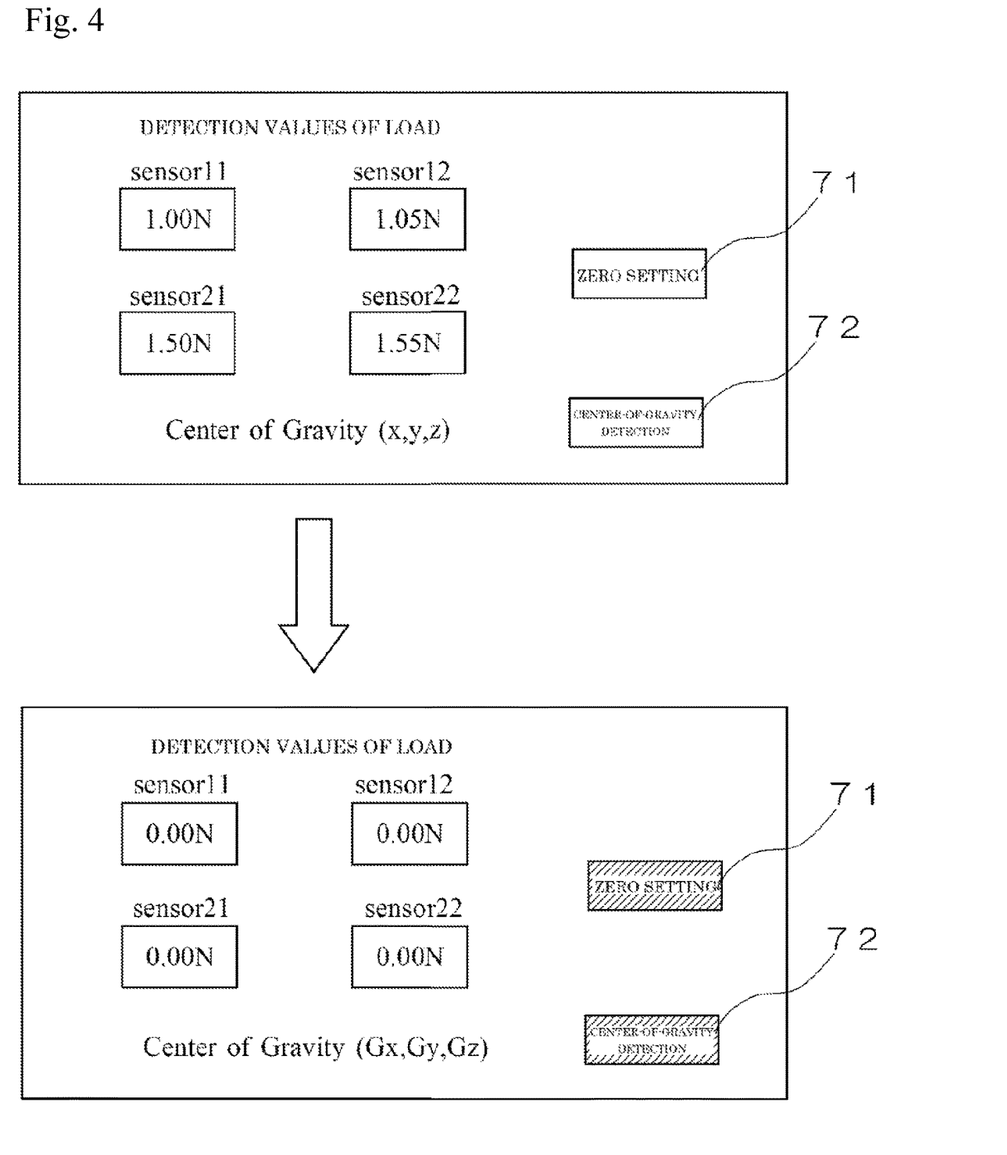
FIG. 4 shows an example of a screen for performing initial setting in the embodiment.

When attaching such a load detecting device 6, the initial setting of the load sensor S needs to be performed according to the size of the attached ingot 52. The loads applied to the load sensors S in the initial state differ between when a large ingot 52 such as that shown in FIG. 3A is attached and when a small ingot 52 such as that shown in FIG. 3B is attached. So, in a state where the ingot 52 is attached to the slicing table 51, loads are detected by the load sensors S, and the loads are preset to zero by depressing a zero setting button 71 on the display screen of a personal computer shown in FIG. 4. After the load sensors S are preset, a "center-of-gravity detection" button 72 shown in FIG. 4 is depressed, and the center-of-gravity position G of the ingot 52 attached to the slicing table 51 is thereby obtained. When obtaining the center-of-gravity position G of the ingot 52, loads are detected using the load sensors S provided in the vicinities of the four corners of the load detecting device 6, a center of moment is obtained using the plurality of load sensors S provided in the X-axis direction, and a center of moment is obtained using the plurality of load sensors S provided in the Y-axis direction. The thus calculated center of moment is stored as the coordinate (Gx, Gy, Gz) of the center of gravity G of the ingot 52.

Next, the operation when cutting the ingot 52 using such an ingot cutting apparatus 1 and the method for detecting the load using the load detecting device 6 will be described.

First, when cutting the ingot 52, the front end of the wire 3 is pulled out from the pay-out bobbin 21, the wire 3 is wound around the main rollers 22, and then the front end thereof is wound on the recovering bobbin 23. Besides, the ingot 52 is attached to the slicing table 51, the load sensors S are preset to zero by depressing the "zero setting" button 71, and the coordinate (Gx, Gy, Gz) of the center of gravity G of the ingot 52 attached to the slicing table 51 is calculated by depressing the "center-of-gravity detection" button 72.

After such initial setting is completed, the ingot 52 is lowered while the wire 3 is caused to run and coolant liquid is discharged from the cooling unit 4. The ingot 52 is cut by the wire 3, and thin silicon wafers are cut out. At this time, when causing the wire 3 to run, the wire 3 is caused to run about 800 meters in the forward direction, is stopped, and is then caused to run about 780 meters in the backward direction by reversing the motor. In the same manner, the wire 3 is caused to run in the forward direction and the backward direction while the ingot 52 is pressed against the wire 3, and the ingot 52 is cut.

In the process of cutting the ingot 52, as shown in FIG. 5, the wire 3 becomes blunt on the old wire side 52o of the ingot 52, and the cutting grooves 52a in the ingot 52 are shallow. On the other hand, the cutting grooves 52a on the new wire side 52n of the ingot 52 are deep. Therefore, on the old wire side 52o of the ingot 52, the wire 3 is significantly bent, and may break. So, the difference in load between the new wire side 52n and the old wire side 52o of the ingot 52 is detected by the load sensors S so that the cutting states of the ingot 52 on the new wire side 52n and the old wire side 52o can be grasped.

First Embodiment

Figure 6:
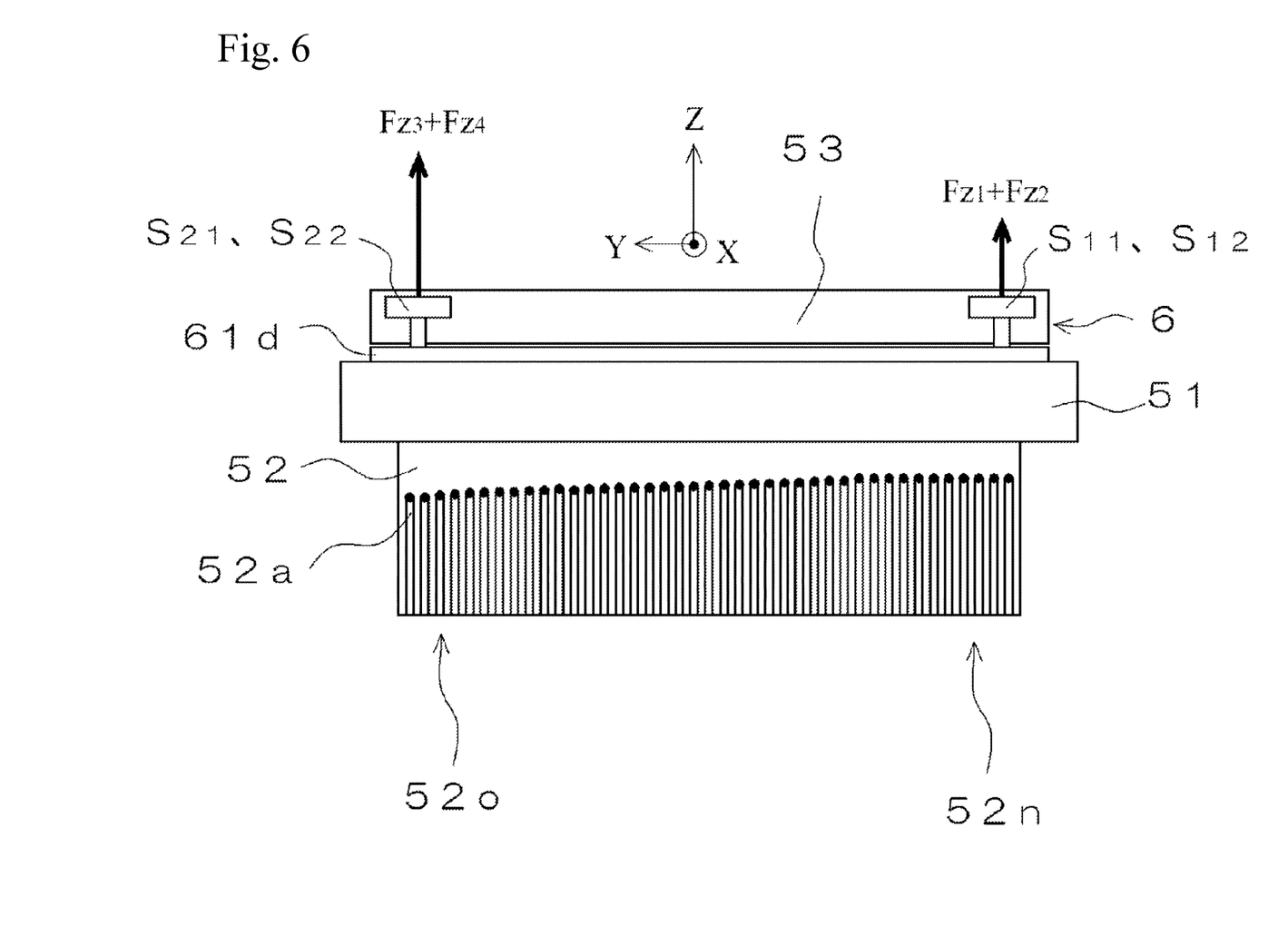
FIG. 6 shows a state where loads in the Z-axis direction are detected in the embodiment.

As an example of a detecting method using such load sensors S, a method can be used in which loads along the Z-axis direction, the direction in which the ingot 52 is pressed, are detected as shown in FIG. 6. When detecting loads in the Z-axis direction, the load detecting device 6 may be provided with at least one load sensor S on each of the new wire side 52n and the old wire side 52o, and loads in the Z-axis direction may be detected. When two load sensors S are provided on each of the new wire side 52n and the old wire side 52o as shown in FIG. 2, the sum value (Fz1+Fz2) of the two load sensors S on the new wire side 52n and the sum value (Fz3+Fz4) of the two load sensors S on the old wire side 52o may be output. In such a configuration in which loads in the Z-axis direction are detected, when the wire 3 becomes worn and the cutting grooves 52a on the old wire side 52o become shallow, reaction force of the wire 3 against the pressing of the ingot 52 is large, and large loads in the Z-axis direction are detected on the old wire side 52o. On the other hand, since the cutting grooves 52a on the new wire side 52n are relatively deep, reaction force of the wire 3 is small, and small loads in the Z-axis direction are detected. So, such detection values of the new wire side 52n and the old wire side 52o are output to a control unit provided on the board 64 of the load detecting device 6, and notification for replacement of the wire, control of the conveying speed of the wire 3, control of the pressing speed of the ingot 52, and so forth are performed so that the breakage of the wire 3 can be prevented. When such a control unit is provided in the load detecting device 6, the breakage of the wire 3 can be prevented just by attaching the load detecting device 6 to an existing ingot cutting apparatus.

When loads in the Z-axis direction are detected, the bending of the wire 3 can be determined from the detection values, and the breakage of the wire 3 can be prevented by reducing the pressing speed of the ingot 52 or increasing the amount of paying out of new wire 3.

Second Embodiment

Figure 7:
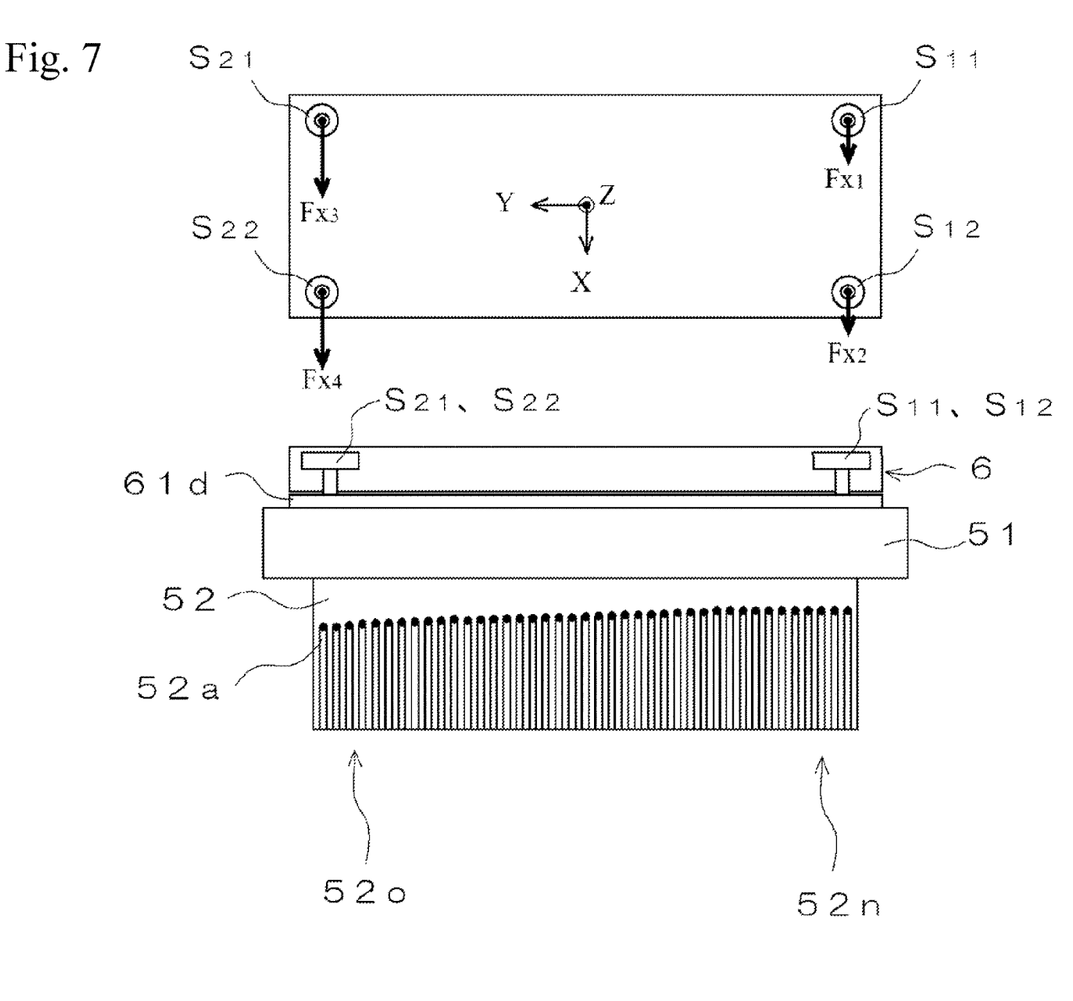
FIG. 7 shows a state where loads in the X-axis direction are detected in the embodiment.

As another detecting method, a method can be used in which loads in a direction along the X-axis, the direction in which the wire 3 runs, are detected as shown in FIG. 7. As with the above case, the load detecting device 6 may be provided with at least one load sensor S on each of the new wire side 52n and the old wire side 52o, and loads in the X-axis direction may be detected. When two load sensors S are provided on each of the new wire side 52n and the old wire side 52o as shown in FIG. 2, the sum value (Fx1+Fx2) of the load sensors S on the new wire side 52n and the sum value (Fx3+Fx4) of the load sensors S on the old wire side 52o are output. In such a configuration, when the wire 3 becomes worn by use, the cutting grooves 52a on the old wire side 52o of the ingot 52 become shallow, reaction force of the wire 3 against the pressing of the ingot 52 is large, and the loads in the X-axis direction are large. On the other hand, since the cutting grooves 52a on the new wire side 52n are relatively deep, reaction force of the wire 3 is small, and the loads in the X-axis direction are small. So, such detection values of the new wire side 52n and the old wire side 52o are output to the control unit of the load detecting device 6, and notification for replacement of the wire, control of the conveying speed of the wire 3, control of the pressing speed of the ingot 52, and so forth are performed so that the breakage of the wire 3 can be prevented.

When loads in the X-axis direction are detected, the breakage of the wire 3 can be prevented by defecting the difference in tension along the running direction of the wire 3 and comparing to the breaking load along the axial direction of the wire 3.

Third Embodiment

Figure 8:
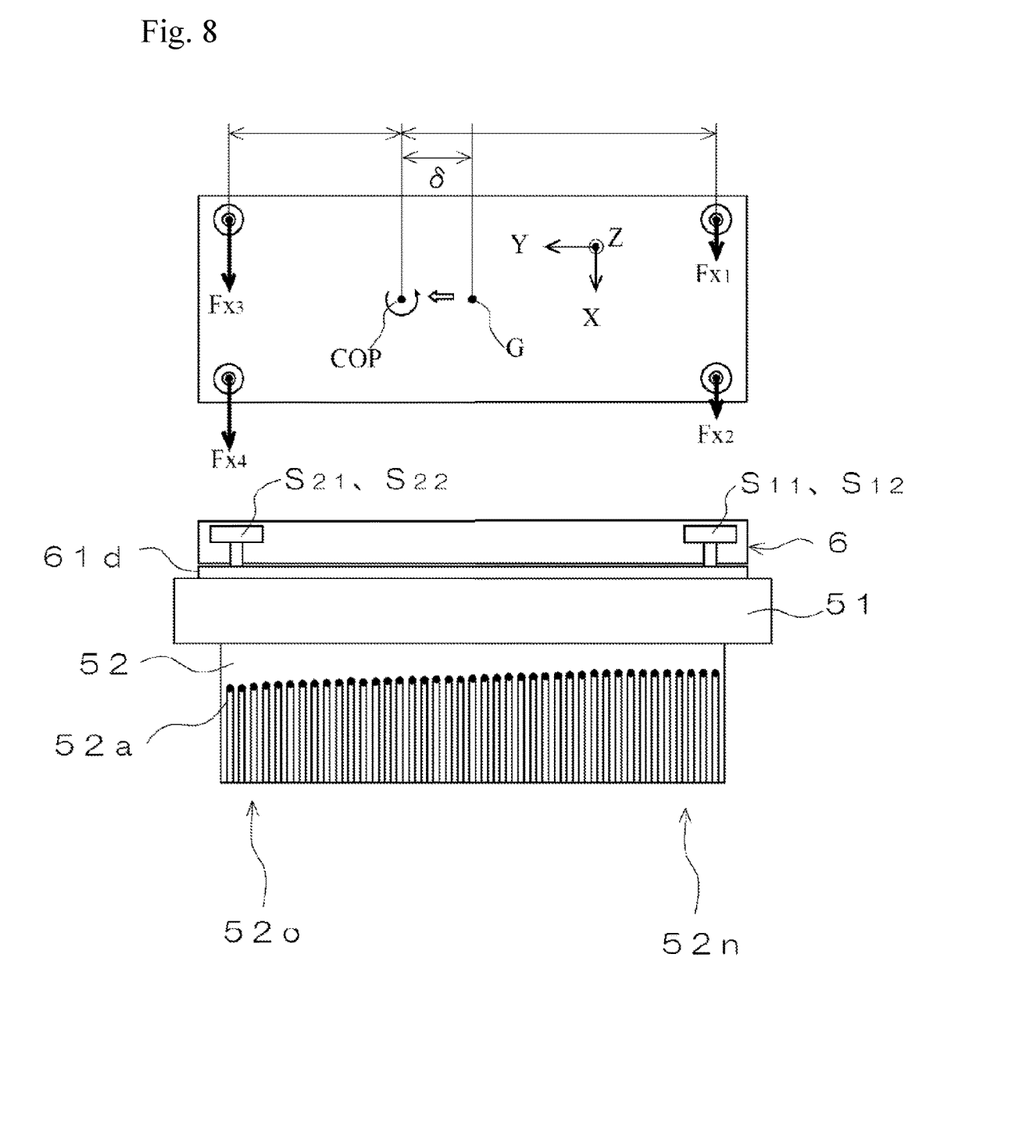
FIG. 8 shows a state where loads in the Z-axis direction are detected in the embodiment.

As another detecting method, the moment about the Z-axis acting on the ingot 52 may be detected and output as shown in FIG. 8. As such a moment, loads in the X-axis direction on the new wire side 52n and the old wire side 52o are detected, and the moment about the Z-axis of the ingot 52 is calculated so that the cutting state of the ingot 52 can be grasped from the value of the moment. In such a configuration, the wear of the wire 3 can also be detected by obtaining the moment from the loads on the new wire side 52n and the old wire side 52o, and comparing the value of the moment with a reference value.

Alternatively, the center of pressure COP of the moment may be obtained so that the wear of the wire 3 can be determined on the basis of the amount of movement of the center of pressure of the moment. Specifically, when the detection value in the X-axis direction on the old wire side 52o increases with the wear of the wire 3, the center of pressure of moment approaches the old wire side 52o. When the distance between the previously obtained center of gravity G of the ingot 52 and the center of pressure COP of moment becomes greater than a reference value, it may be determined that the wear becomes significant, and notification for replacement of the wire, control of the conveying speed of the wire 3, control of the pressing speed of the ingot 52, and so forth may be performed through the control unit of the load detecting device 6 so that the breakage of the wire 3 can be prevented.

Fourth Embodiment

Figure 9:
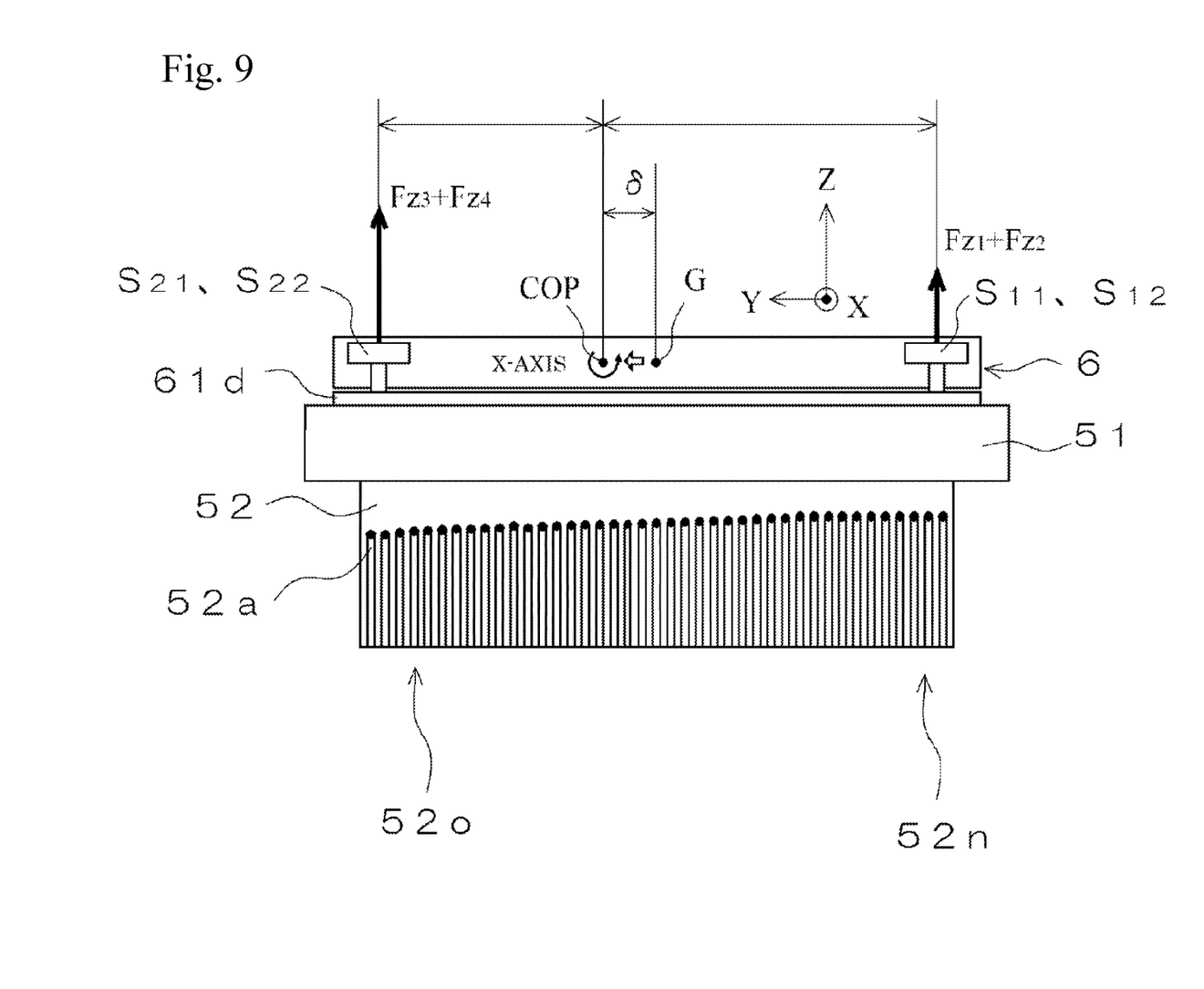
FIG. 9 shows a state where the moment about the X-axis is detected in the embodiment.

As another detecting method, a method can be used in which the moment about the X-axis acting on the ingot 52 is detected as shown in FIG. 9. As such a moment, loads in the Z-axis direction on the new wire side 52n and the old wire side 52o are detected, and the moment about the X-axis of the ingot 52 is calculated. By comparing the value of the moment with a reference value, the wear of the wire 3 can also be detected.

Alternatively, the center of pressure COP of the moment may be obtained so that the wear of the wire 3 can be determined on the basis of the amount of movement of the center of pressure of the moment. Specifically, when the loads in the Z-axis direction on the old wire side 52o increases with the wear of the wire 3, the center of pressure of moment approaches the old wire side 52o. When the distance between the previously obtained center of gravity G of the ingot 52 and the center of pressure of moment becomes greater than a reference value, it is determined that the wear becomes significant, and notification for replacement of the wire, control of the conveying speed of the wire 3, control of the pressing speed of the ingot 52, and so forth are performed through the control unit of the load detecting device 6.

Fifth Embodiment

Figure 10:
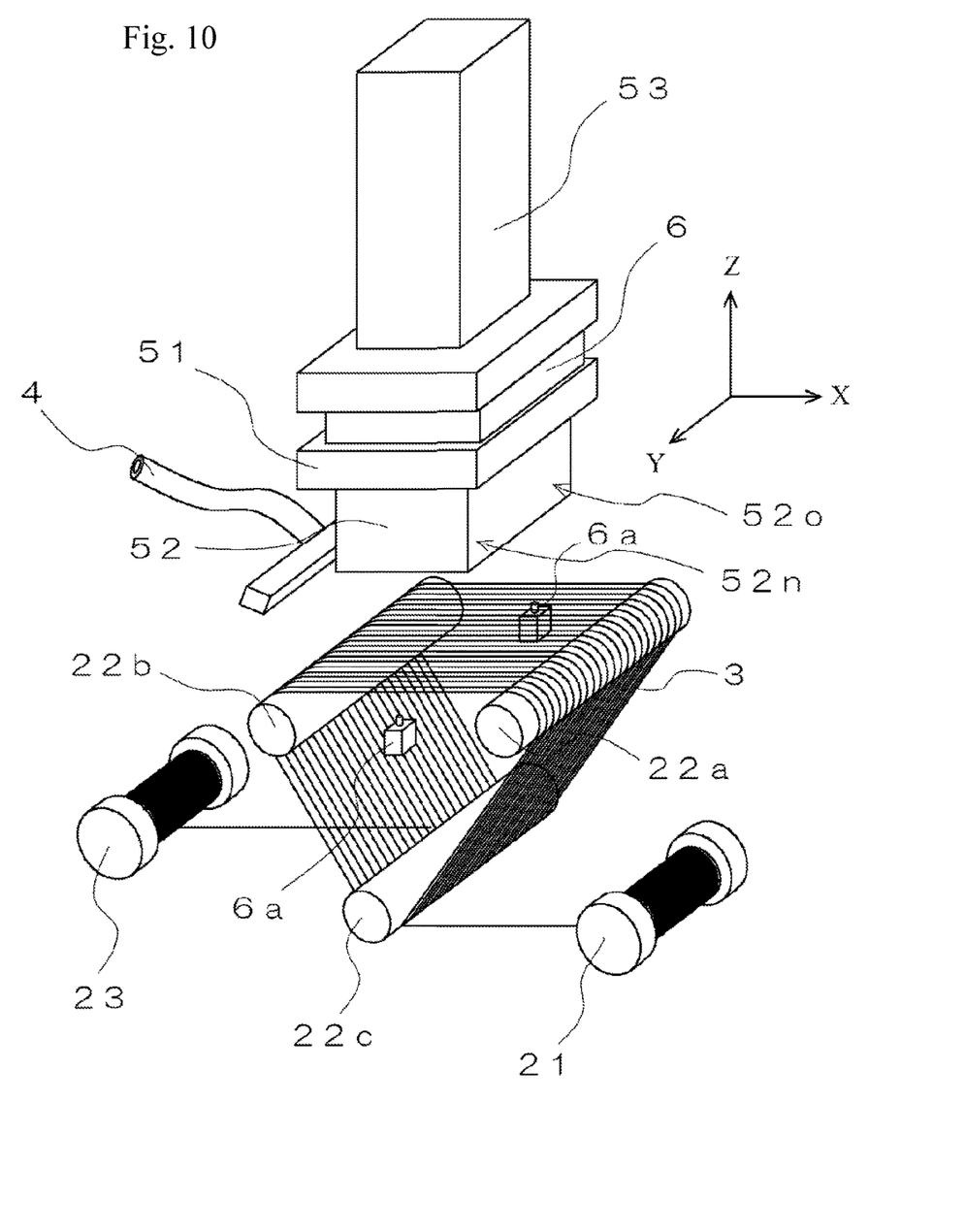
FIG. 10 shows a state where the amount of bending of a wire is detected in the embodiment.

Although, in the above-described first to fourth embodiments, the cutting states of the new wire side 52n and the old wire side 52o are detected from the loads applied to the ingot 52, the amount of bending of the wire 3 may be detected so that the cutting states on the new wire side 52n and the old wire side 52o of the ingot 52 can be detected. In FIG. 10, reference sign 6a denotes a proximity sensor, which can measure the amount of bending of the wire 3. The proximity sensor 6a is provided inside the wire 3 that goes around the new wire side 52n and the old wire side 52o of the ingot 52, and can measure the distance to the wire 3 in the vicinity of the ingot 52 when the ingot 52 is pressed against the wire 3. When the proximity sensor 6a is provided inside the wire 3, the proximity sensor 6a does not interfere the winding of the wire 3 around the main rollers 22. The proximity sensor 6a may be located above and outside the wire 3 going around. When the proximity sensor 6a is located at such a position, the position of the proximity sensor 6a can be easily changed according to the size of the ingot 52. When detecting the amount of bending of the wire 3, it is difficult to optically detect the amount of bending of the wire 3 owing to coolant liquid, and therefore it is recommended to use an inductive proximity sensor 6a that detects the magnetic loss of eddy current generated in the wire 3 due to the influence of external magnetic field. By using such an inductive proximity sensor 6a, the amount of bending can be detected by measuring the distance to the wire 3 which is a metal body, even when coolant liquid exists. The difference in the amount of bending is detected from the detection value of the proximity sensor 6a, this value is compared to a reference value, and notification for replacement of the wire, control of the conveying speed of the wire 3, control of the pressing speed of the ingot 52, and so forth are performed through the control unit of the load detecting device 6.

The control unit of the load detecting device 6 performs control such that the breakage of the wire 3 can be prevented, according to the values and the amount of bending output from the load detecting device 6. Such control methods include a method in which notification for urging replacement of the wire 3 is performed when the difference in load between the new wire side 52n and the old wire side 52o becomes greater than a reference value or when the distance between the center of gravity G and the COP becomes greater than a reference value, a control method in which the speed of the wire 3 is decreased, and a control method in which the speed at which the ingot 52 is pressed against the surface of the wire 3 is decreased. In addition, the difference between the amount of feed in the forward direction of the wire 3 and the amount of return may be increased (for example, 800 meters in the forward direction, and 600 meters in the backward direction) so that more new wire 3 can be paid out from the pay-out-bobbin 21. Although notification, control of the running speed of the wire 3, control of the pressing of the ingot 52, and so forth are performed using the control unit of the load detecting device 6 here, the output values and the amount of bending from the proximity sensor 6a may be displayed directly on a display of a computer. An operator sees the displayed values, and thereby replaces the wire 3, or sets the conveying speed of the wire 3, the pressing speed of the ingot 52, and so forth so that the breakage of the wire 3 can be prevented.

As described above, according to the above-described embodiments, in an ingot cutting apparatus 1 that cuts an ingot 52 using a plurality of stretched wires 3, load sensors S and proximity sensors 6a are provided on the new wire side 52n and the old wire side 52o of the ingot 52, and loads applied to the new wire side 52n and the old wire side 52o of the ingot 52 and the amount of bending of the wire 3 are measured using the sensors S and 6a on the new wire side 52n and the old wire side 52o. Therefore, the difference in cutting state between the new wire side 52n and the old wire side 52o can be grasped, and the difference in tension applied to the wire 3 can be eliminated so that the breakage of the wire 3 can be prevented.

The present invention is not limited to the above-described embodiments, and can be implemented in various embodiments.

For example, although, in the above-described embodiments, the ingot 52 is lowered from above and is pressed against the wire 3, the ingot 52 may be pressed from above, below, left, or right. When changing the pressing direction, the arrangement of parts in the embodiments can be changed accordingly and adapted.

Although, in the above-described embodiments, four load sensors S are provided in the load detecting device 6, one load sensor S may be provided on each of the new wire side 52n and the old wire side 52o, or four or more load sensors S may be provided.

What is claimed is:

1. An ingot cutting apparatus that cuts an ingot by pressing the ingot against a wire wound a plurality of turns around a pair of rollers, the apparatus comprising a measuring device that measures loads applied to the ingot or the amount of bending of the wire on a new wire side where new wire is supplied to the ingot and an old wire side where old wire is recovered, wherein the measuring device includes load sensors attached to a slicing table holding the ingot, and is a device that measures the moment of the ingot about an axis along the pressing direction.

2. The ingot cutting apparatus according to claim 1, wherein the measuring device includes load sensors attached to a slicing table holding the ingot, and is a device that measures loads along a pressing direction of the ingot on the new wire side and the old wire side of the ingot.

3. The ingot cutting apparatus according to claim 1, wherein the measuring device includes load sensors attached to a slicing table holding the ingot, and is a device that measures loads along a running direction of the wire on the new wire side and the old wire side of the ingot.

4. An ingot cutting apparatus that cuts an ingot by pressing the ingot against a wire wound a plurality of turns around a pair of rollers, the apparatus comprising a measuring device that measures loads applied to the ingot or the amount of bending of the wire on a new wire side where new wire is supplied to the ingot and an old wire side where old wire is recovered, wherein the measuring device includes load sensors attached to a slicing table holding the ingot, and is a device that measures the moment of the ingot about an axis along the running direction of the wire.

5. An ingot cutting apparatus that cuts an ingot by pressing the ingot against a wire wound a plurality of turns around a pair of rollers, the apparatus comprising a measuring device that measures loads applied to the ingot or the amount of bending of the wire on a new wire side where new wire is supplied to the ingot and an old wire side where old wire is recovered, wherein the measuring device includes load sensors attached to a slicing table holding the ingot, and is a device that measures the distance between the center of moment of the ingot about an axis erected from the surface of the plurality of wires and the center of gravity of the ingot.

6. An ingot cutting apparatus that cuts an ingot by pressing the ingot against a wire wound a plurality of turns around a pair of rollers, the apparatus comprising a measuring device that measures loads applied to the ingot or the amount of bending of the wire on a new wire side where new wire is supplied to the ingot and an old wire side where old wire is recovered, wherein the measuring device includes load sensors attached to a slicing table holding the ingot, and is a device that measures the distance between the center of moment of the ingot about an axis along the running direction of the wire and the center of gravity of the ingot.

7. The ingot cutting apparatus according to claim 1, wherein the measuring device is composed of an inductive proximity sensor that measures the amount of bending of the wire.

8. The ingot cutting apparatus according to claim 4, wherein the measuring device includes load sensors attached to a slicing table holding the ingot, and is a device that measures loads along a pressing direction of the ingot on the new wire side and the old wire side of the ingot.

9. The ingot cutting apparatus according to claim 4, wherein the measuring device includes load sensors attached to a slicing table holding the ingot, and is a device that measures loads along a running direction of the wire on the new wire side and the old wire side of the ingot.

10. The ingot cutting apparatus according to claim 4, wherein the measuring device is composed of an inductive proximity sensor that measures the amount of bending of the wire.

11. The ingot cutting apparatus according to claim 5, wherein the measuring device includes load sensors attached to a slicing table holding the ingot, and is a device that measures loads along a pressing direction of the ingot on the new wire side and the old wire side of the ingot.

12. The ingot cutting apparatus according to claim 5, wherein the measuring device includes load sensors attached to a slicing table holding the ingot, and is a device that measures loads along a running direction of the wire on the new wire side and the old wire side of the ingot.

13. The ingot cutting apparatus according to claim 5, wherein the measuring device is composed of an inductive proximity sensor that measures the amount of bending of the wire.

14. The ingot cutting apparatus according to claim 6, wherein the measuring device includes load sensors attached to a slicing table holding the ingot, and is a device that measures loads along a pressing direction of the ingot on the new wire side and the old wire side of the ingot.

15. The ingot cutting apparatus according to claim 6, wherein the measuring device includes load sensors attached to a slicing table holding the ingot, and is a device that measures loads along a running direction of the wire on the new wire side and the old wire side of the ingot.

16. The ingot cutting apparatus according to claim 6, wherein the measuring device is composed of an inductive proximity sensor that measures the amount of bending of the wire.

* * * * *